Nov. 6, 1928.
L. A. JONES
1,690,584
APPARATUS FOR PRODUCING KALEIDOSCOPIC DESIGNS
Filed April 21, 1924
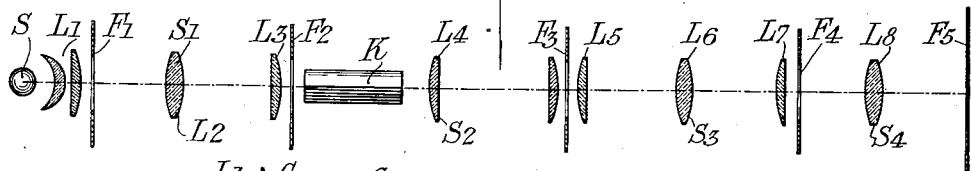
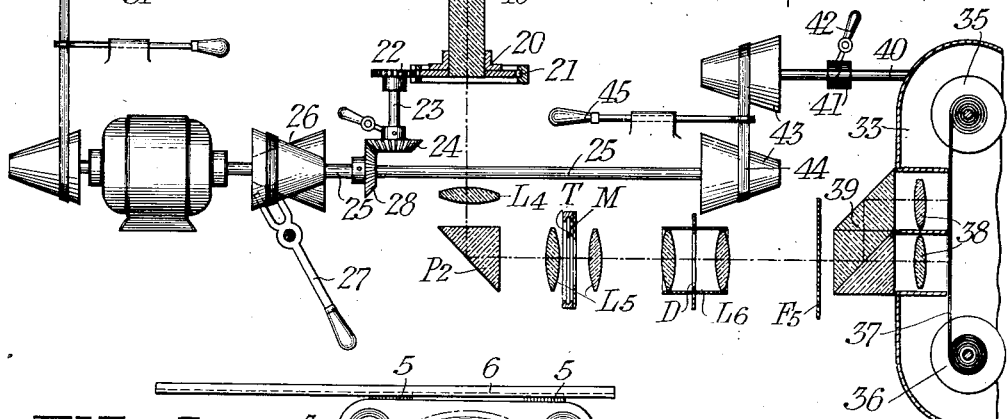
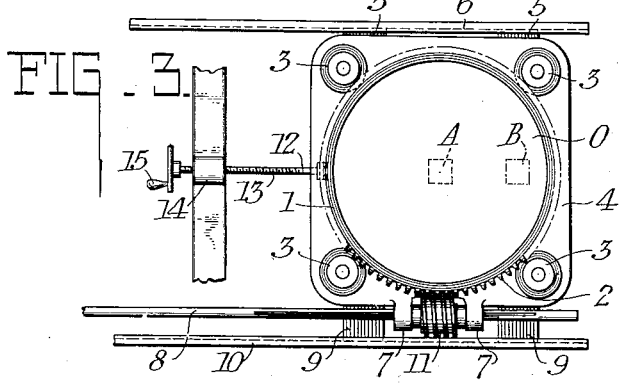
INVENTOR,
Loyd A. Jones,
BY R. L. Stinchfield
N. M. Perrins
ATTORNEYS.

Patented Nov. 6, 1928.

1,690,584

UNITED STATES PATENT OFFICE.

LOYD A. JONES, OF ROCHESTER, NEW YORK, ASSIGNOR TO EASTMAN KODAK COMPANY, OF ROCHESTER, NEW YORK, A CORPORATION OF NEW YORK.

APPARATUS FOR PRODUCING KALEIDOSCOPIC DESIGNS.

Application filed April 21, 1924. Serial No. 707,900.

This invention relates to an instrument for producing and recording mobile color effects.

In particular it is my object to reproduce the infinitely varying effects that can be produced in kaleidoscopic apparatus. By continuously moving the kaleidoscopic prism, a color design and an ornamental design simultaneously at independently variable speeds, designs are produced that merge one into the other and are expressive of and conducive to varying emotions. These designs when reproduced by a color motion picture process can be projected for purposes of entertainment; they can be used as color settings for background or scenic effects for dramatic and motion picture productions, for backgrounds for titles used for motion pictures, advertising, or announcement purposes and in many other ways.

Reference will now be made to the accompanying drawings in which:

Fig. 1 is a diagram of an optical system;

Fig. 2 is a schematic showing of an instrument embodying my invention;

Fig. 3 shows the detail of the adjustable mounting of the design disc.

S represent a source of light and $L_1$ a condenser system which brings the rays to a focus at $S_1$ substantially at a second collective lens system $L_2$. The second lens system $L_2$ focuses at $F_2$ the image of a plane $F_1$ at or near $L_1$. At $F_2$ is a third collective lens system $L_3$ bringing the rays from $S_1$ to a focus at $F_2$. A series of these collective lens systems is provided so spaced that at or near alternate ones, $L_2$, $L_4$, $L_6$, and $L_3$ the image of the light is focused at $S_1$, $S_2$, $S_3$ and $S_4$; and at or near the others $L_3$, $L_5$, and $L_7$ the images at the planes $F_1$, $F_2$, and $F_3$ are reproduced, the images of all of these and $F_4$ being reproduced together at the last focal plane $F_5$. This is one of a type of optical systems generally known as periscopic systems.

The rays from the light source are in a beam that furnishes a substantially uniform illumination at the screens or planes $F_1$ to $F_5$. It follows that if a diaphragm or mask be placed at $F_1$ or other analogous plane, it will be reproduced with a masking effect at the final plane $F_5$, while if a diaphragm or mask be placed at $S_1$, $S_2$, $S_3$ or $S_4$ it will affect the amount of light passed, or intensity of the illumination, but not its border shape. If a series of image carrying plates are placed at $F_1$, $F_2$, $F_3$ and $F_4$, they will be combined and reproduced in focus at $F_5$. For instance, a color design may be placed at $F_1$, an ornamental design at $F_2$, a diaphragm at $F_3$ and a title at $F_4$ and there will be produced at $F_5$, which may be a projector screen, the combined image comprising a title on an ornamental design background selectively colored and masked.

I propose further to place just beyond that station, $F_2$, where an ornamental design would be positioned, an internally reflecting polygonal prism K which would multiply the design at $F_2$ in a symmetrical pattern, thus constituting a kaleidoscope. There would then be reproduced at $F_5$ a title with a masked, colored kaleidoscopic background.

It is obvious that the position of the colored screen is immaterial if it is desired to color all the rays uniformly, but if it has a changeable color design it should be introduced at or near one of the planes such as $F_1$.

It is to be understood that wherever I refer to a lens, there would in practice be a lens system comprising whatever combination of elements best fills the particular requirements. In Figure 2, I have shown, largely diametrically, the arrangement of the above system which in practice I have found most useful. In this diagram the spacing between the elements has been much shortened in order to give a compact and understandable diagram. Moreover the casing, supports and such other mechanical details as would be necessary in an instrument have been omitted and only those essential relations and arrangements disclosed as are useful to an understanding of the invention.

Rays from the source of light S, and its reflector R are collected by the condenser system $L_1$, and focused at $S_1$ near lens system $L_2$, then reflected downwardly by prism $P_1$ to the lens system $L_3$ at which is the design disc. This disc comprises a round light transmitting plate O, which is covered with designs, preferably non-symmetrical and merging one into another in every direction. This disc is in an annular frame 1 with external gear teeth 2 around its entire periphery. These mesh with idle positioning pinions 3 carried on the plate 4, which is guided at one edge by the lugs 5 sliding in the channel bar 6, and at the opposite edge by eyes 7 slidably engaging around shaft 8, and by lugs 9 sliding in channel bar 10. Slidably but non-rotatably mounted on shaft 8 is worm 11, engaging gear teeth 2. The plate 4 is adjustable as a whole by the rod 12, the screw threads 13 of which engage in a threaded eye in support 14, and which may be turned by handle 15. It is obvious that by turning shaft 8 and handle 15 any area such as A or B of the plate O can be brought to projection position in line with the end of the kaleidoscopic prism K. The shaft 8 is turned from motor 16 by the cone pulleys 17 and belt 18, these constituting a variable speed drive controlled by handle 19.

The prism K is carried in the mount 20 carrying the gear 21, driven by pinion 22 on shaft 23, bevel gears 28 and 24, shaft 25, and variable speed drive 26, controlled by handle 27. Bevel gear 24 is slidable on shaft 23, being controlled by handle 29 to disconnect the driving connection, and a clutch 30 and operating handle 31 are also provided to disconnect the drive from design plate O.

Near the condenser system is mounted a color screen C which is mounted and controlled in the same way as design plate O. The detail showing is therefore omitted as it would merely confuse the drawing and the arrows 32 indicate universal adjustment of this part.

The light rays, after passing through prism K where they are internally reflected, pass through lens system $L_4$, and reflecting prism $P_2$ to lens system $L_5$, at which is the gate where a suitable masking device M is provided and also a frame T for a fixed transparency or title. The rays then pass to the projection objective $L_6$ in which is a diaphragm D and are then thrown at the light transmitting projection screen $F_5$, where the resultant image may be viewed or where it may be photographed.

In a position from which photographs of the screen may be made is placed a camera 33, preferably a motion picture color camera, the details of which constitute no part of the present invention. It includes the film reels 35 and 36, film 37, lenses 38, and the light splitting prism system 39. It is driven by shaft 40, in which is the clutch 41, controlled by handle 42. The variable speed drive comprises the cone pulleys 43, belt 44 and control handle 45, one of the pulleys being shown as mounted on a continuation of shaft 25.

As noted above, these parts are all shown schematically, and are not drawn to scale nor in relative proportions. The showing is sufficient, however, to show the operative relations of which my invention consists and from it an instrument designer could readily lay out a practical embodiment.

In practice the color disc C, design plate O and kaleidoscope prism K are adjusted and rotated under the control of the operator under varying conditions. When he observes on the screen $F_5$ a combination that he thinks particularly pleasing he starts the camera and records as much as he thinks desirable. Any one of the elements may be adjusted or its movement stopped, in accordance with the operator's wishes. If the purpose is to make a motion picture title, the desired lettering design is placed at T, or the letters may be attached to the projection screen. The diaphragm D controls the intensity of the light and the mask or diaphragm M the shape of the projected area.

The record will be reproduced by any desired process preferably as registering differentially colored images on opposite sides of a double coated motion picture film. The kaleidoscopic prism may be of any of the well known forms and may be of a hollow polygonal prism with mirror walls, or a polygonal glass block with internally reflecting surfaces. The symmetry or lack of symmetry in the pattern produced will of course depend largely on the shape of the polygonal section, which may vary in the number of sides, and may be symmetrical or unsymmetrical.

It is obvious that numerous modifications are possible and I contemplate as within the scope of my invention all such embodiments and equivalents as are comprehended within the appended claims.

Having thus described my invention, what I claim as new and desire to secure by Letters Patent is:

1. An instrument comprising means for supporting a color screen, two separated design carrying members, means for projecting light in focus from such color screen and each of said design carrying members to a screen, a kaleidoscopic prism mounted in the path of light from one of said design members, certain of said elements being movable, a motion picture camera for recording the images so projected and interconnected means for simultaneously varying the images projected through the kaleidoscopic prism by movement of such elements and for operating the motion picture camera.

2. An instrument comprising a projection screen, two elements, one element being a support for a design and the second element being a support for a kaleidoscopic prism mounted between the first element and the screen; one of said elements being mounted for movement in a definite predetermined manner, a second design carrying member mounted between said second element and the screen, and a projection system adapted to project light successively through a design on the first support, a kaleidoscopic prism on the second support, and a design on the third support, and to project the designs in focus and in superposition on the screen said system including a lens focusing the first design upon the second, and including a lens focusing both designs on the screen.

3. An instrument comprising a projection screen, two elements, one element being a support for a design and the second element being a support for a kaleidoscopic prism mounted between the first element and the screen, one of said elements being mounted for movement in a definite predetermined manner, a second design carrying member mounted between said second element and the screen, and a projection system adapted to project light successively through a design on the first support, a kaleidoscopic prism on the second support, and a design on the third support, and to project the designs in superposition on the screen, and a motion picture camera for recording the projected designs, and interconnected means for simultaneously moving said movable element and operating said camera.

4. An instrument including a source of light, two separated supports for carrying designs in separated planes, a screen, an optical system including elements directing light from said source evenly upon one of said planes, and including also lenses focusing an image from said evenly illuminated plane in superposition upon an image at the other plane and focusing both said images in superposition on the screen and including also a rotatable kaleidoscopic prism in the path of light between said evenly illuminated plane and said screen.

5. An instrument including a source of light, two separated supports for carrying designs in separated planes, a screen, an optical system including elements directing light from said source evenly upon one of said planes, and including also lenses focusing an image from said evenly illuminated plane in superposition upon an image at the other plane and focusing both said images in superposition on the screen and including also a rotatable kaleidoscopic prism in the path of light between said evenly illuminated planes.

6. An instrument including a source of light, two separated supports for carrying designs in separated planes, a screen, an optical system including elements directing light from said source evenly upon one of said planes, and including also lenses focusing an image from said evenly illuminated plane in superposition upon an image at the other plane and focusing both said images in superposition on the screen and including also a rotatable kaleidoscopic prism in the path of light between said evenly illuminated planes and said screen and separately controllable means for rotating said kaleidoscope and a design at one of the planes.

7. An instrument including a source of light, two separated supports for carrying designs in separate planes, a screen, an optical system including elements directing light from said source evenly upon one of said planes, and including also lenses focusing an image from said evenly illuminated plane in superposition upon an image at the other plane and focusing both said images in superposition on the screen and including also a rotatable kaleidoscopic prism in the path of light between said evenly illuminated plane and said screen and separately controllable means for rotating said kaleidoscopic and a design at the evenly illuminated plane.

Signed at Rochester, New York, this 15th day of April 1924.

LOYD A. JONES.